(12) United States Patent
Haddad

(10) Patent No.: US 6,234,444 B1
(45) Date of Patent: May 22, 2001

(54) PLANT SUPPORTER

(76) Inventor: Richard Y. Haddad, 2315 Morrow Rd., Pittsburgh, PA (US) 15241

( * ) Notice: Subject to any disclaimer, the term of this patent is extended or adjusted under 35 U.S.C. 154(b) by 0 days.

(21) Appl. No.: 09/358,793

(22) Filed: Jul. 22, 1999

(51) Int. Cl.[7] ................................................. F16M 13/00
(52) U.S. Cl. ......................... 248/545; 248/530; 248/535; 248/533; 248/156
(58) Field of Search ..................... 248/545, 27.8, 248/530, 532, 535, 156, 533

(56) References Cited

U.S. PATENT DOCUMENTS

| | | |
|---|---|---|
| 156,097 | 10/1874 | McDonald . |
| 184,064 | 11/1876 | Daul . |
| 374,906 | 12/1887 | Rovane . |
| 703,019 | 6/1902 | Thomas . |
| 897,006 | 8/1908 | Müller . |
| 933,112 | 9/1909 | Rieman . |
| 1,174,901 | 3/1916 | Schaible . |
| 1,543,957 | 6/1925 | Steiner . |
| 1,843,366 | 2/1932 | Kreimer . |
| 2,000,911 | 5/1935 | Balousek ................................. 47/47 |
| 2,764,846 | 10/1956 | Worthington ........................... 47/47 |
| 2,788,615 | 4/1957 | Hauser ..................................... 47/47 |
| 3,293,809 | 12/1966 | Daline ..................................... 52/157 |
| 3,746,600 | * 7/1973 | Circelli ................................... 161/14 |
| 4,026,068 | 5/1977 | Tepper .................................... 47/45 |
| 4,048,752 | 9/1977 | Anderson ................................ 47/47 |
| 4,161,768 | * 7/1979 | Gauthier et al. ...................... 362/123 |
| 4,254,579 | 3/1981 | Flynn ...................................... 47/46 |
| 4,610,107 | 9/1986 | Testa ....................................... 47/47 |
| 4,785,576 | 11/1988 | Morgan ................................... 47/28 |
| 4,860,489 | 8/1989 | Bork ........................................ 47/47 |
| 5,067,274 | * 11/1991 | Lewis ...................................... 47/47 |
| 5,323,559 | 6/1994 | Allman .................................... 47/45 |
| 5,349,780 | * 9/1994 | Dyke ....................................... 47/47 |
| 5,595,019 | 1/1997 | Foreman ................................. 47/47 |
| 5,984,587 | * 11/1999 | Odle ................................. 248/545 X |

* cited by examiner

*Primary Examiner*—Leslie A. Braun
*Assistant Examiner*—A. Joseph Wujciak
(74) *Attorney, Agent, or Firm*—Webb Ziesenheim Logsdon Orkin & Hanson, P.C.

(57) ABSTRACT

A plant supporter is disclosed utilizing a pole having lugs attached to it. Apertures extend into each lug and cantilevered arms extend from the apertures outwardly from the pole to provide support to a plant. The lugs may have a resilient clip portion such that they may be easily mounted or removed from the pole.

18 Claims, 2 Drawing Sheets

PLANT SUPPORTER

BACKGROUND OF THE INVENTION

1. Field of the Invention

The invention is directed to a device for supporting plants and, more specifically, the invention is directed to a support pole having cantilevered arms for supporting plants.

2. Description of the Related Art

A variety of plant supporters having different designs exist. U.S. Pat. No. 703,019 to Thomas discloses a carnation supporter comprised of a pole having pivoting rings attached thereto which lock in a horizontal position upon the pole to provide support. However, such an arrangement requires precise positioning of each end of the circular supports on the pole so that it contacts and rests against a horizontally extending portion of the support. Additionally, a load upon the circular support may deform the support such that the two ends may slip past the horizontal support portion thereby collapsing a support.

U.S. Pat. No. 933,112 to Rieman discloses a flower supporter comprised of a post made of twisted wire having circular supports of the same twisted wire extending from the post. However, such a device is fairly complex and the position of a supporting arm is fixed.

Furthermore, the length of many of these poles creates an additional problem because installing such a pole often requires the use of a hammer. For a long pole, it may be difficult for an individual to comfortably reach the top of the pole to apply blows from a hammer thereby driving the pole into the ground.

These and other shortcomings are sought to be overcome by the proposed invention.

BRIEF SUMMARY OF THE INVENTION

The invention is directed to a plant supporter comprised of a pole with at least one lug secured thereupon, wherein the at least one lug has an aperture extending therein, wherein that lug is adapted to removably receive and horizontally support a cantilevered arm, wherein the pole has a tapered bottom portion terminating in a point to promote penetrating the pole in the ground.

In a second embodiment, the invention is directed to a plant supporter as described above but wherein the pole is comprised of at least a top segment and a bottom segment and wherein the bottom segment has a top end which accepts a removable cap for protecting the end when the bottom segment is hammered into the ground.

DETAILED DESCRIPTION OF THE INVENTION

Figure 1:
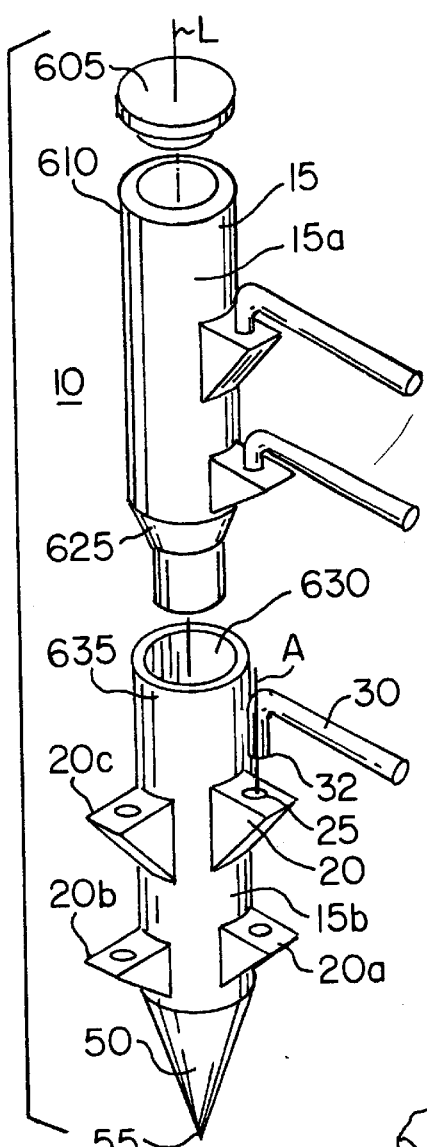
FIG. 1 illustrates a perspective view of the plant supporter in accordance with one embodiment of the subject invention.

FIG. 1 illustrates a plant supporter 10 which may be used to support a variety of plants including vegetables such as beans. The plant supporter 10 is comprised of a pole 15 which may be comprised of at least two segments 15a, 15b removably attached to one another.

The pole 15 of the plant supporter 10 has at least one lug 20 secured thereupon wherein the lug 20 has an aperture 25 extending into the lug 20 and wherein the lug 20 is adapted to removably receive and horizontally support a cantilevered arm 30. The arm 30 and lug 20 are illustrated in an exploded position on segment 15b and in an assembled position on segment 15a.

The aperture 40 may extend completely through the lug 20 or partially into the lug 20 when there is sufficient support for the arm 30 using such an aperture 40 extending only partially through the lug 20. The aperture axis A is generally vertical, however, may be angled at an angle sufficient to provide support to the arm 30 when a weight is placed upon the arm 30.

The aperture 25 may be generally cylindrical in shape to conform with the shape of the first end 32 of the arm 30. However, the aperture 25 may have any number of different shapes which may be compatible with the first end 32 of the arm 30.

Although FIG. 1 illustrates only a single aperture 40 within the lug 20, there may be more than one aperture 40 in a lug 20 to accommodate more than one support arm 30. Subsequent embodiments will illustrate lugs having multiple apertures therein.

As illustrated in FIG. 1, the lug 20 is integral with the pole 15. A plurality of lugs 20a, b, c, in addition to lug 20, may be positioned in a spaced apart relationship and may be integral with pole 15. In the alternative, as illustrated in FIG. 2, a band 45 may extend around the outside of the pole 15, may contain a plurality of apertures 40 thereby eliminating the need for a plurality of distinct lugs 20 as illustrated in FIG. 1.

Figure 2:
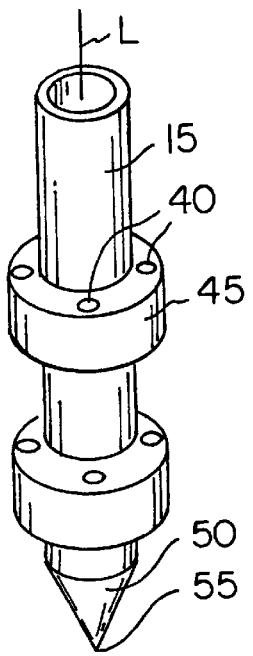
FIG. 2 illustrates a second embodiment of the plant supporter in accordance with the subject invention.

While FIGS. 1 and 2 illustrate lugs which are integral with the pole 15, it is entirely possible and many times desirable to provide a lug that is removable from the pole. FIGS. 3–7 illustrate arrangements whereby the lug is removably attached to the pole.

Figure 3:
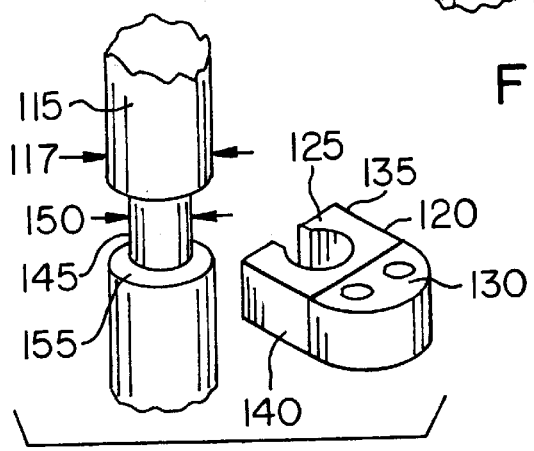

FIG. 3 illustrates a pole 115 with a lug 120 having a clip portion 125 and an arm support portion 130. The clip portion 125 is comprised of two resilient extensions 135, 140 which are opposed to one another and which, when urged apart, fit over an outer diameter 117 of the pole 115. When the resilient extensions 135, 140 are released, they clamp against the pole 115. In this fashion, the lug 120 is removably attached to the pole 115.

As also illustrated in FIG. 3, the pole 115 may have a groove 145 therein with a groove outside diameter 150 and a groove bottom surface 155. The clip portion 125 of the lug 120 may be urged over the pole 115 at the groove 145 such that the resilient extensions 135, 140 expand and clip around the pole 115 at the groove 145. The lug 120 rests upon the bottom surface 155 of the groove 145 to prevent vertical slippage of the lug 120 on the pole 115.

Figure 4:
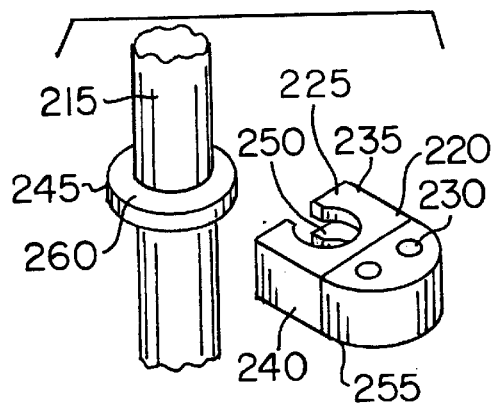
FIGS. 3–6 illustrate exploded perspective views of various other embodiments to secure the lug to the pole in accordance with the subject invention.

In FIG. 4, an alternate embodiment is illustrated whereby the pole 215 accepts a lug 220 having a clip portion 225 with an arm support portion 230 and resilient extensions 235, 240. A band 245 extends around the pole 215. The clip portion 225 has a horizontal slot 250 extending therethrough such that the horizontal slot 250 fits around the band 245 when the lug is resiliently secured to the pole 215. In this fashion, the lug 220 is prevented from vertical slippage on the pole 215. It is also possible to secure the lug 220 to the pole 215 above the band 245 such that the bottom 255 of the lug 220 rests upon the top 260 of the band 245 thereby preventing vertical slippage on the pole 215.

Figure 5:
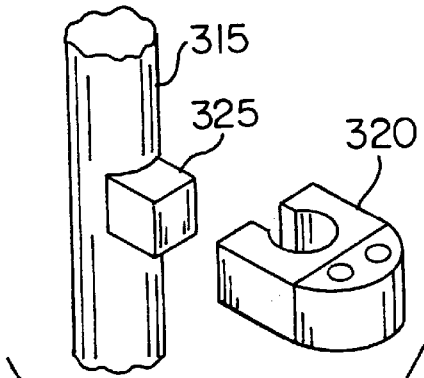

FIG. 5 illustrates a pole 315 onto which a lug 320 is resiliently secured. The lug 320 illustrated in FIG. 5 is identical to the lug 120 previously discussed with FIG. 3 and, for that reason, no further discussion of lug 320 will be presented with this embodiment. To prevent vertical slippage of the lug 320 on the pole 315, a protruding nub 325 is connected to the pole 315. The protruding nub 325 is an integral part of the pole 315.

Figure 6:
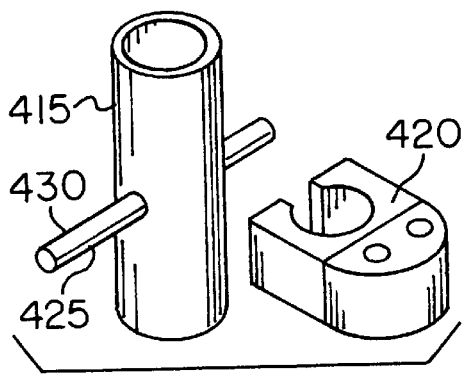

FIG. 6 shows yet another embodiment of the pole 415 utilizing a lug 420 again identical to that lug 120 discussed in FIG. 3. However, the pole 415 has a rod 425 extending through the pole 415 to provide at least one extension 430 beyond the outer surface of the pole 415. The lug 420 is placed on the pole 415 above the extension 430 and the extension 430 prevents vertical slippage of the lug 420 on the pole 415.

Figure 7:
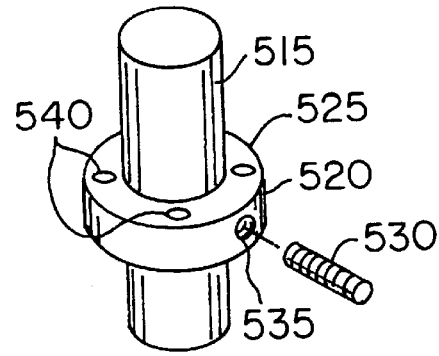
FIG. 7 illustrates a perspective view of yet another embodiment to secure the lug to the pole.

FIG. 7 shows yet another embodiment in which a pole 515 has a lug 520 in the shape of a band 525 which extends around the pole 515. A set screw 530 extends through a threaded bore 535 in the band 525 to frictionally secure the band 525 to the pole 515 to prevent vertical slippage. Apertures 540 extend into the band 525 to accept cantilevered arms (not shown).

Figure 8:
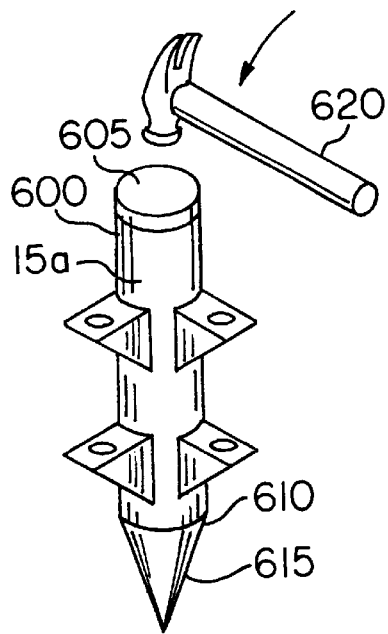
FIG. 8 illustrates yet another embodiment of the subject invention incorporating a removable cap to protect the end of a bottom segment from the blows of a hammer.

Finally, with references to FIGS. 1 and 8, the bottom pole segment 15b has a top end 600 which, as shown in FIG. 8, accepts a removable cap 605. This cap 605 is also illustrated in FIG. 1 where it is also used as a decorative cap which may be secured to the top end 610 of pole segment 15b. In this fashion, when the cap 605 is not being used as a protective cap on segment 15b, it may be removed and placed on the top 610 of pole segment 15a to function as a decorative cap and to protect the inside of the pole 15 from accumulating water or dirt. The cap 605 acts as a protective cap, when in place on the pole 15a, and may be tapped with a hammer 620 until the bottom pole segment 15a is secured within the ground. At that point, the cap 605 may be easily removed and, if desired, returned to the top pole segment 15b to act as a decorative cap. The bottom end 610 of the pole 15a has a tapered section 615 which may be conical to promote insertion of the bottom pole segment 15a into the ground to act as an anchor to the pole 15. The top pole segment 15b, which has a tapered bottom portion 625 (FIG. 1), may be secured to the bottom pole segment 15a through a mating open 630 in the top end 635 of the bottom pole segment 15a.

Although each of these figures illustrates a pole which has a circular cross section, it is entirely possible for the cross section of the pole to have any number of different geometries and the shape of the clip in each of the lugs may be modified accordingly.

It is thought that the present invention and many of its intended advantages will be understood from the foregoing description and it will be apparent that various changes may be made in the form, construction and arrangement of the parts thereof without departing from the spirit and the scope of the invention or sacrificing all of its material advantages, the form hereinbefore described being merely preferred or exemplary embodiments thereof.

What is claimed is:

1. A plant supporter comprised of a pole with at least one lug having a clip portion, wherein the clip portion is comprised of two opposing resilient extensions which may be clamped upon and secured to the outer surface of the pole to prevent rotation of the lug about an axis perpendicular to a longitudinal axis along the pole, wherein the at least one lug has an aperture extending therein and wherein that lug is adapted to removably receive and horizontally support a cantilevered arm, said pole having an obstruction thereon to prevent vertical slippage of said lug and wherein the pole has a tapered bottom portion terminating in a point to promote penetrating the pole in the ground.

2. The plant supporter according to claim 1 wherein the aperture extends completely through the lug along an aperture axis.

3. The plant supporter according to claim 1 wherein the aperture axis is generally vertical.

4. The plant supporter according to claim 1 wherein the aperture is generally cylindrical in shape.

5. The plant supporter according to claim 1 further including an arm having an end mounted within the aperture.

6. The plant supporter according to claim 1 wherein the lug is integral with the pole.

7. The plant supporter according to claim 6 wherein the lug is a band extending about the pole.

8. The plant supporter according to claim 1 wherein the lug is removably attached to the pole.

9. The plant supporter according to claim 8 wherein the lug is a band around the pole and a set screw extends through the band to press against the pole and prevent vertical slippage.

10. The plant supporter according to claim 8 wherein lug has resilient clip which clamps to the pole.

11. The plant supporter according to claim 10 wherein the pole has a groove therein or a band thereon which engages a mating groove or band on the clip to prevent vertical slippage of the lug on the pole.

12. The plant supporter according to claim 10 wherein pole has a protruding nub upon which the lug rests to prevent vertical slippage.

13. The plant supporter according to claim 10 wherein pole has an outwardly extending band upon which the lug rests to prevent vertical slippage.

14. The plant supporter according to claim 10 wherein pole has rod extending therethrough to prevent vertical slippage.

15. The plant supporter according to claim 1 wherein the pole is comprised of at least a top segment and a bottom segment which are removably secured to one another, wherein the bottom segment has a top end which accepts a removable cap for protecting the end when the bottom segment is hammered into the ground.

16. The plant supporter according to claim 15 wherein the length of the bottom segment is less than 4 feet.

17. The plant supporter according to claim 15 wherein the cap is suitable as a top cap for the assembled pole.

18. The plant supporter according to claim 1 wherein the pole is comprised of at least a top segment and a bottom segment which are removably secured to one another, wherein the bottom segment has a tapered bottom portion terminating in a point to promote penetrating the bottom segment in the ground.

* * * * *